Aug. 3, 1937.       M. WASSERMAN       2,089,141
VALVED WASTE OUTLET TRAP
Filed June 10, 1936
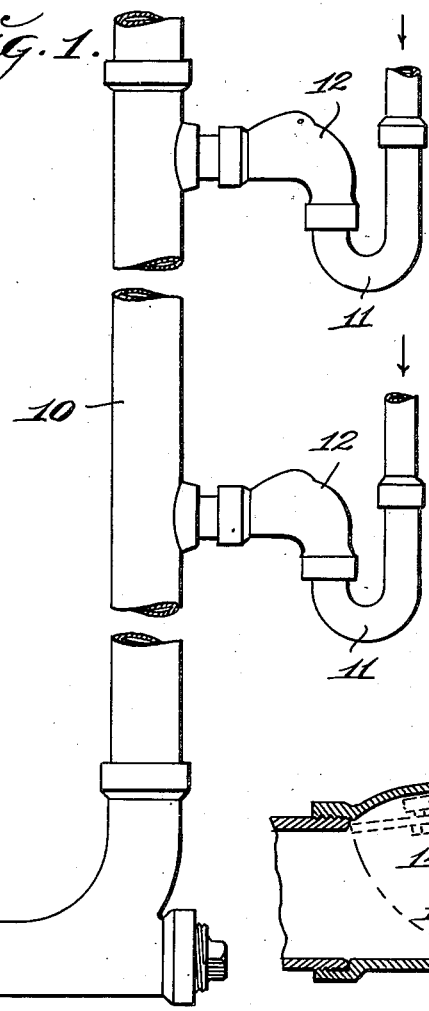
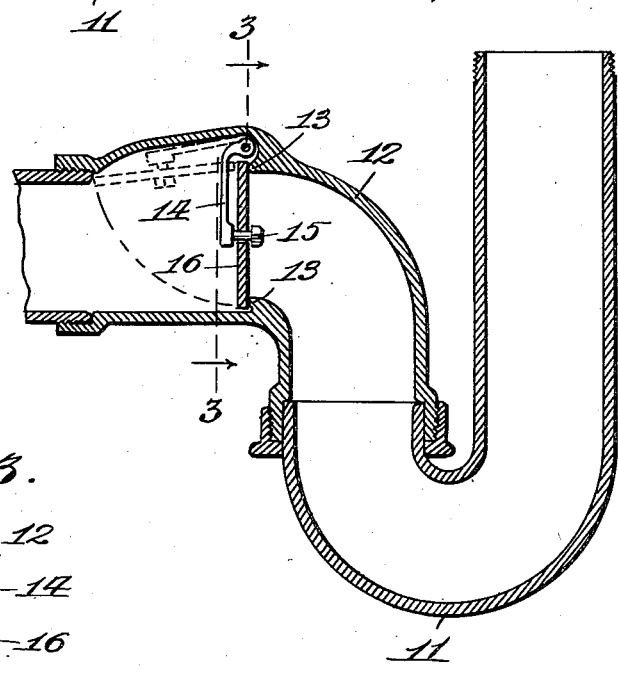
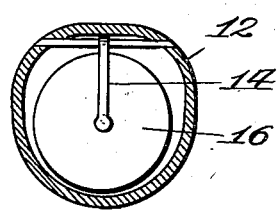
INVENTOR,
MORRIS WASSERMAN.
BY Martin P. Smith, ATTY.

Patented Aug. 3, 1937

2,089,141

UNITED STATES PATENT OFFICE 2,089,141

VALVED WASTE OUTLET TRAP

Morris Wasserman, Los Angeles, Calif.

Application June 10, 1936, Serial No. 84,520

1 Claim. (Cl. 182—16)

My invention relates generally to plumbing outlet traps and more particularly to an outlet trap having a valve that maintains its normal closed position by gravity and the principal object of my invention is, to provide a relatively simple, practical and inexpensive valved trap particularly adapted for use in the outlet connections of bath tubs, closet bowls, sinks, stationary wash tubs and the like and which will be effective in preventing sewage, noxious gases and the like from backing up through the outlet fitting and passing into the building or household plumbing with resultant damage to floors, plaster and furnishings.

In the event that the waste pipe that leads from the plumbing fixtures of a building to the sewer becomes clogged, the waste water or sewage that passes into the upper portion of the waste pipe of the building from the plumbing fixtures therein, will back up through the lower traps connected to the waste pipe and overflow through the fixtures, thereby causing damage to floors, ceilings and furnishings and it is the prime object of my invention to provide the traps that connect the plumbing fixtures with the building waste pipe, with automatic valves that will effectively prevent water, sewage and the like from passing backwardly through the traps, which action causes damage and consequent expense as above set forth.

A further object of my invention is, to provide a valved outlet trap that conforms with the accepted standards of plumbing practice and installation and which may be very easily and quickly installed.

A further object of my invention is, to provide simple and efficient means for effectively preventing foul air and noxious gases from being siphoned from the sewer outlet back through the trap.

With the foregoing and other objects in view my invention consists in certain novel features of construction and arrangements of parts that will be hereinafter more fully described and claimed and illustrated in the accompanying drawing in which:

Fig. 1 is an elevational view of a portion of a waste pipe, the lower end of which is connected in the conventional manner to a sewer or other outlet and showing valved traps of my improved construction connected to said waste pipe.

Fig. 2 is a vertical section taken through the center of a valved trap as contemplated by my invention.

Fig. 3 is a cross section taken on the line 3—3 of Fig. 2.

Referring by numerals to the accompanying drawing which illustrates a preferred embodiment of my invention, 10 designates a waste pipe of the type generally employed in buildings and the lower end of said waste pipe is connected in the conventional manner to a sewer or other outlet.

At various points throughout the height of the waste pipe 10, outlet traps from the plumbing fixtures in the building are connected to said waste pipe and in accordance with my invention, the trap includes a substantially U-shaped tubular member 11 which functions as a water seal trap, has one end connected to the waste pipe that leads from the outlet of a closet bowl, bath tub, sink, stationary wash tub or the like.

Suitably connected to the other leg of the trap 11, is the lower end of the vertical leg of an elbow-shaped tubular fitting 12, and the end of the horizontal leg of this fitting is suitably connected to the waste pipe 10.

Formed within the horizontal leg of fitting 12, adjacent the point where the same joins the vertical leg, is an annular rib or flange 13 that provides a vertically disposed valve seat.

Hingedly mounted in the upper portion of the horizontal leg of fitting 12, directly in front of and above the valve seat 13, is the upper end of a substantially L-shaped arm 14, the horizontal leg of which projects toward the valve seat 13.

The seat 13 is concentrically arranged within the horizontal portion of the fitting 12 and the horizontal member of arm 14 occupies a position in the center of the annular valve seat.

Loosely mounted on the horizontal member of arm 14 and retained thereon by a head or stud 15 that is formed on the end of the horizontal member of the arm, is a disc valve 16 of any suitable material, preferably soft metal, and which normally resists on valve seat 13 and thereby cutting off the back flow of sewage water, foul air or noxious gases from waste pipe 10 into and through trap 11.

The mounting of the arm 14 in the fitting 12 is such that the valve 16 carried by said arm normally rests by gravity against the seat 13, thereby closing the passageway through said fitting 12, but the pressure of any water or sewage from the fixture to which the trap is connected, will exert sufficient pressure against the valve 16 to swing the same outwardly and upwardly away from seat 13 so that said waste water or sewage may discharge into the waste pipe 10.

In the event that the lower portion of the waste pipe or its outlet to the sewer becomes clogged, the accumulation of sewage arising in the waste pipe cannot pass outwardly through the valved traps connected thereto due to the presence of the valves within said traps and any pressures developed by the sewage seeking an outlet through the valve trap will act upon the valve to force and hold the same against its seat 13.

Inasmuch as the valve normally maintains its closed position by gravity, it will be impossible for any foul air or noxious gases to be siphoned back through the trap and its fitting and thus the passage of foul air and gases into the rooms of the equipped building is effectively prevented.

Thus it will be seen that I have provided a valved fitting for the outlet traps of plumbing systems, which fitting is relatively simple in construction, inexpensive of manufacture and very effective in performing the functions for which it is intended.

The structure of the valve fitting is such that it conforms with the standard plumbing practice and said fitting may be very easily and quickly applied to an outlet trap and waste pipe.

It will be understood that minor changes in the size, form, and construction of the various parts of my improved valved waste outlet trap may be made and substituted for those herein shown and described without departing from the spirit of the invention, the scope of which is set forth in the appended claim.

I claim as my invention:

The combination with a trap, of an elbow-shaped tubular member having the lower end of its vertical leg detachably connected to one of the legs of said trap, an annular valve seat formed within the horizontal portion of said L-shaped member, an inverted L-shaped arm pivotally mounted in the upper portion of said L-shaped member in front of said valve seat, a headed pin projecting from the lower end of said inverted L-shaped arm through the opening surrounded by said valve seat, and a disk valve mounted for limited sliding movement upon said headed pin.

MORRIS WASSERMAN.